(12) United States Patent
Holle

(10) Patent No.: US 6,885,974 B2
(45) Date of Patent: Apr. 26, 2005

(54) DYNAMIC POWER CONTROL APPARATUS, SYSTEMS AND METHODS

(75) Inventor: Matthew H. Holle, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 146 days.

(21) Appl. No.: 10/356,010

(22) Filed: Jan. 31, 2003

(65) Prior Publication Data

US 2004/0153263 A1 Aug. 5, 2004

(51) Int. Cl.$^7$ ................................................ G06F 1/32
(52) U.S. Cl. ........................ 702/182; 713/300; 713/323; 713/324
(58) Field of Search ........................... 702/182, 60, 61, 702/62, 63; 713/300, 310, 320, 321, 323, 324, 330

(56) References Cited

U.S. PATENT DOCUMENTS

| | | | |
|---|---|---|---|
| 5,300,831 A | | 4/1994 | Pham et al. |
| 5,544,138 A | * | 8/1996 | Bajorek et al. .......... 369/53.42 |
| 5,682,272 A | * | 10/1997 | Taroda et al. .................. 360/53 |
| 5,758,175 A | * | 5/1998 | Fung .......................... 713/323 |
| 5,784,628 A | | 7/1998 | Reneris |
| 5,821,924 A | * | 10/1998 | Kikinis et al. .............. 345/212 |
| 5,822,597 A | | 10/1998 | Kawano et al. |
| 5,913,067 A | * | 6/1999 | Klein ......................... 713/300 |
| 5,954,820 A | * | 9/1999 | Hetzler ....................... 713/323 |
| 2002/0178387 A1 | * | 11/2002 | Theron ....................... 713/300 |
| 2004/0039954 A1 | * | 2/2004 | White et al. ................ 713/322 |

OTHER PUBLICATIONS

Lu et al., "Comparing System–Level Power Management Policies", IEEE, 2001.*
Lu et al., "Power–Aware Operating Systems for Interactive Systems", IEEE, 2002.*
Benini et al., "Monitoring System Activity for OS–Directed Dynamic Power Management", IEEE, 1998.*
Paul Gauthier, Daishi Harada, and Mark Stemm, "Reducing Power Consumption for the Next Generation of PDAs: It's in the Network Interface!", Jan. 2, 1996, 32 pages.
Bruce Sherrod, "A Dynamic Disk Spin–Down Technique for Mobile Computing", A dissertation submitted in partial satisfaction of the requirements for the degree of Master Science in Computer Science, Mar. 1997, 57 pages.

* cited by examiner

Primary Examiner—Patrick J. Assouad
(74) Attorney, Agent, or Firm—Amin & Turocy, LLP

(57) ABSTRACT

Dynamic power controller apparatus, systems and methods are provided which utilize system and user data to control power to components. The present invention employs dynamically controlled idle timeout values which are based, in part, on the historical use of the component. It can also employ user settings, event occurrences and available resources of a system to dynamically control the power to one of the system's components or a remote component. In an instance of the present invention related to hard disk power control, it is employed in an operating system's kernel where disk idleness is monitored. When the hard disk's idle time meets a dynamically computed power control idle timeout, the disk driver is commanded to power down the device.

41 Claims, 10 Drawing Sheets

| WEIGHT | FREQUENCY | APPLICATION | EVENT |
|---|---|---|---|
| 0 | 10 | WORD | READ |
| 1 | 12 | EXCEL | WRITE |
| 2 | 8 | ••• | MOUSE MOVEMENT |
| 3 | 11 | | KEY STROKE |
| 4 | 4 | | SYSTEM EVENT LOG |
| ••• | ••• | | ••• |

FIG. 4

DYNAMIC POWER CONTROL APPARATUS, SYSTEMS AND METHODS

TECHNICAL FIELD

The present invention relates generally to power control, and more particularly to apparatus, systems and methods facilitating dynamic power control of computer related devices.

BACKGROUND OF THE INVENTION

Computers have pervaded most aspects of our daily lives. Their usage has enabled great strides in our society in many different areas. As computer technology advances, the computing devices become more powerful and, at the same time, smaller in size. Business people, scientists and every day users have become attached to the usefulness of their computers to the point that they demand that the devices be made more portable so they can be carried at all times. This has led to development of "laptop" computers followed by even smaller "handheld" devices. The computing power in these portables often rivals much larger "desktop" computers. However, the desktop computers are normally plugged into an "infinite" power source, namely the local energy company via an electrical outlet. Portable devices do not have this luxury of unlimited power. They normally operate from various types of batteries which have limited energy and require recharging when that energy is depleted. Because portable computer users depend so heavily on their batteries, great strides have been made in increasing the available energy in batteries. Nickel cadmium, lithium ion, and other types of batteries have allowed prolonged computer usage on similar sized batteries. However, the technological progression of this type of energy source has reached a plateau of sorts and large breakthroughs in battery performances are not expected to occur any time in the near future.

Meanwhile, manufacturers have continued to produce faster and more powerful portable devices that require even more power to operate. Thus, the hardware has reached a point where strides in extra battery power are offset by the increased power needs of the faster processors. The net outcome of these advances is the same operational time duration out of a given device.

Users, however, continually demand that their portable devices operate for longer periods of time between recharges of the batteries. This has led to the application of various "energy saving" techniques to be applied in computing platforms via software. The main power using components tend to be the display, processor and hard drive of a computing device. Typically, these components remain active or "on" whether or not they are being used by the user. This is not a very efficient way to use power and most of the battery energy is wasted while the computer is waiting for the user to input tasks.

Energy saving modes were developed utilizing the computing device's software as a first attempt to prolong battery life from a given energy storage level. A user would select a mode such as "battery power" which would cause certain components to power down after a predetermined length of time. This often irritated the user because, for example, the screen might go blank after 10 minutes while the user was giving a presentation. Thus, the next evolution in energy savings techniques allowed the user to set the duration that certain components would remain powered on. This allowed, for instance, the user who was giving a presentation to set the screen to not blank for two hours so the presentation could be completed without a shutdown occurring.

This manual mode setting of duration, however, means the user must constantly adjust the duration or energy will be wasted. For example, after a presentation, the user could forget to reset the duration, to say 10 minutes, and chat with coworkers after the presentation is completed. In this example, the screen would remain operational for another two hours when it did not need to be powered on at all.

Battery energy conservation has progressed over time but it still has not reached maximum efficiency. Modern day users continue to demand that their devices operate longer between charges and without carrying multiple, heavy battery devices. Portable computational devices in our modern way of life can increase our productivity when they operate. A non-operational device, on the other hand, is not only counterproductive, it also becomes a burden that must be lugged around, providing no utility whatsoever.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to power control, and more particularly to apparatus, systems and methods facilitating power control of computer related devices. Environmental and usage characteristics such as user settings, event occurrences, prior utilization and available resources influence a dynamic power controller provided by the present invention. By controlling computer components in this manner, battery life of devices, such as portable computing devices, can be extended, thereby reducing the dependency on battery energy storage technology and extending the usefulness of portable computing platforms without costly hardware/accessory upgrades, mitigating related lifetime cost of ownership of such devices.

The present invention facilitates prolonging energy storage devices by decreasing power consumption of computing components through employment of a dynamic power control means, extending a device's portable operating time. Generally, power management is a discrete function preset by an end user. This is accomplished by the end user who sets values for when various computer components will power down. This type of energy use management is not very efficient and relies on the user to continually tweak the values to optimize energy management. The present invention drastically increases longevity of an energy source, maximizing the portability of a device, decreasing the complexity of power management relative to the user, and mitigating the dependency on future energy storage technological improvements.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 4 is an exemplary event data structure in accordance with an aspect of the present invention.

DETAILED DESCRIPTION OF THE INVENTION

Figure 1:
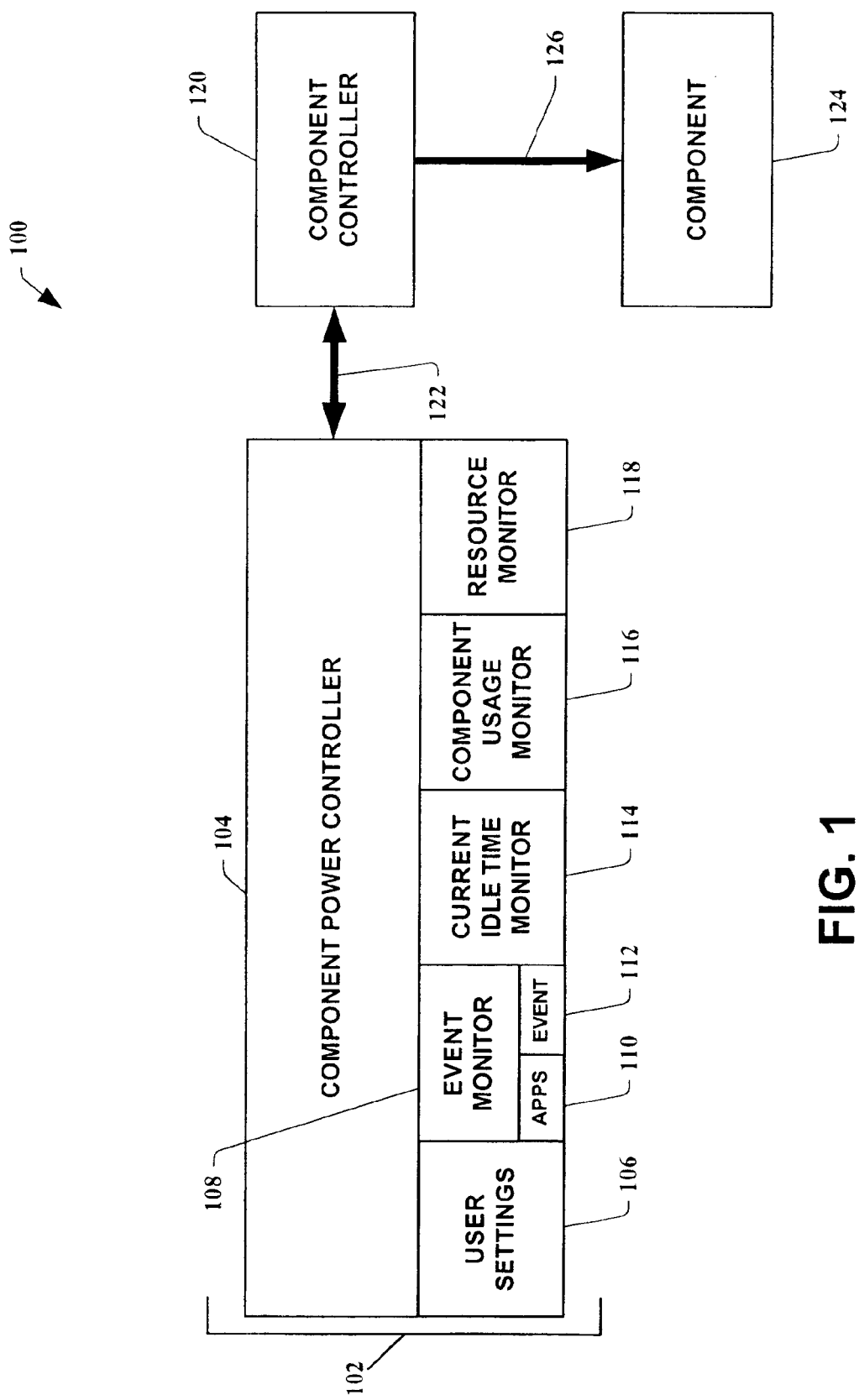
FIG. 1 is a block diagram of a power control system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

In a typical computer operating system, the user is allowed to change the idle timeout for many components of the machine (hard disk, monitor, etc.). The system will then power off components if they have been idle (no accesses or usages have occurred) for some specified amount of time, and the user has specified, through policy, that it is okay to power down the component under such circumstances. There is usually a default setting on laptops for this type of behavior due to their normal dependencies on batteries for portability. The problem is that the user does not have a good understanding of how these components are actually being employed by the system. The present invention, however, dynamically changes the idle timeout of these components based on historical data and environmental parameters. For example, very often, in an idle system, the hard disk will power down, then after a few minutes, a system service will detect an idle state, spin up and log data to the system event log, causing the disk to re-spin. The idle timeout must occur again before power can be removed from the disk, wasting battery power during this timeout period.

In one instance of the present invention, the idle timeout for a component, such as a hard disk, is decreased very aggressively the first time the disk is powered down. After that, if the powered down state duration lasts a (relatively) long time before the disk is re-spun, the idle timeout is kept low. For idle systems, the present invention generally reduces the amount of time the disk requires power by as much as 80% in some circumstances.

In another instance of the present invention, the disk idle timeout is tuned based on past disk activity (usage). For example, the aggressive disk timeout on a typical operating system is approximately 3 minutes. If an idle system is monitored, it will power down the disk after about 10 minutes (7 minutes of administration, then 3 minutes of idleness while before the timeout). If the disk is monitored for the next 10 minutes, the present invention improvement can be illustrated. As a further example, an operating system installation could require the disk to be powered for about 450 of the 600 seconds (10 minutes×60 seconds/minute). With the present invention employed in the kernel of the operating system, the system only requires the disk to be spun for approximately 90 seconds of those 600 seconds, an 80% reduction.

Referring to FIG. 1, a block diagram of a power control system 100 in accordance with an aspect of the present invention is illustrated. The power control system 100 is comprised of a power control device 102, a component controller 120 and a component 124 ("component under control"). The power control device 102 has an interface 122 with the component controller 120. This interface 122 is normally comprised of digital data packets, but can also be analog type signals. The component controller 120 additionally has an interface 126 with the component 124 (or "device") being controlled. This interface 126 is also normally comprised of digital data packets, but can be comprised of analog type signals.

In one instance of the present invention, the power control device 102 is comprised of a component power controller 104 interfacing to user settings 106, an event monitor 108 comprised of an application monitor entity 110 and an event request monitor entity 112, a current idle time monitor 114, a component usage monitor 116, and a resource monitor 118. The component power controller 104 utilizes the user settings 106 (or "user config", i.e. user configuration), event monitor 108, current idle time monitor 114, component usage monitor 116, and resource monitor 118 to determine when the component 124 should be powered down to conserve power. Often, this power conservation is required for devices utilizing limited power resources such as batteries. However, the present invention can also be utilized to conserve power even from somewhat seemingly unlimited power sources such as a local utility company as part of a general energy conservation program. Thus, the present invention can be employed equally well in both portable devices such as laptops and handhelds and the like and non-portable devices such as desktop computers, servers, mainframes, and the like.

The component power controller 104 normally does not interface directly with the component 124 being controlled. This is because hardware type devices typically utilize a software component called a "driver" or component controller 120. A driver (or "device driver") is a software component that permits the computer system to communicate with a particular device. In the computing industry, it is generally accepted that a hardware manufacturer knows the intricacies of their own hardware better than another party. Therefore, traditionally, the manufacturer of a hardware device or component also provides the device driver or component controller. Typically, a driver is a device specific control program (only works with a very particular configuration of hardware) that enables a computer to work with a particular device. Because the driver handles device specific features, the operating system is freed from the burden of having to understand and support the needs of individual hardware devices.

In other instances of the present invention, the component power controller 104 can interface directly with the component 124, eliminating the intermediate component controller 120. This is typically done when the component 124 is generally not complex and standard interfaces of a computer operating system can be utilized to control the component.

Components that can be controlled by the present invention include, but are not limited to, such devices such as monitors, hard drives, scanners, printers, audio components (such as computer speakers and computer audio component boards), peripheral component controller boards, cdrom drives, dvd drives, servers, and temporarily connected devices such as cameras and memory storage devices, and the like. It should also be noted that it is not necessary for a component to be physically located in or near a system employing the present device. In other instances, a computer employing the present invention can even be in one country while controlling components located in another country. This can be done with direct communications, satellite communications and via additional networked computing resources such as those employed by the internet infrastructure.

Figure 2:
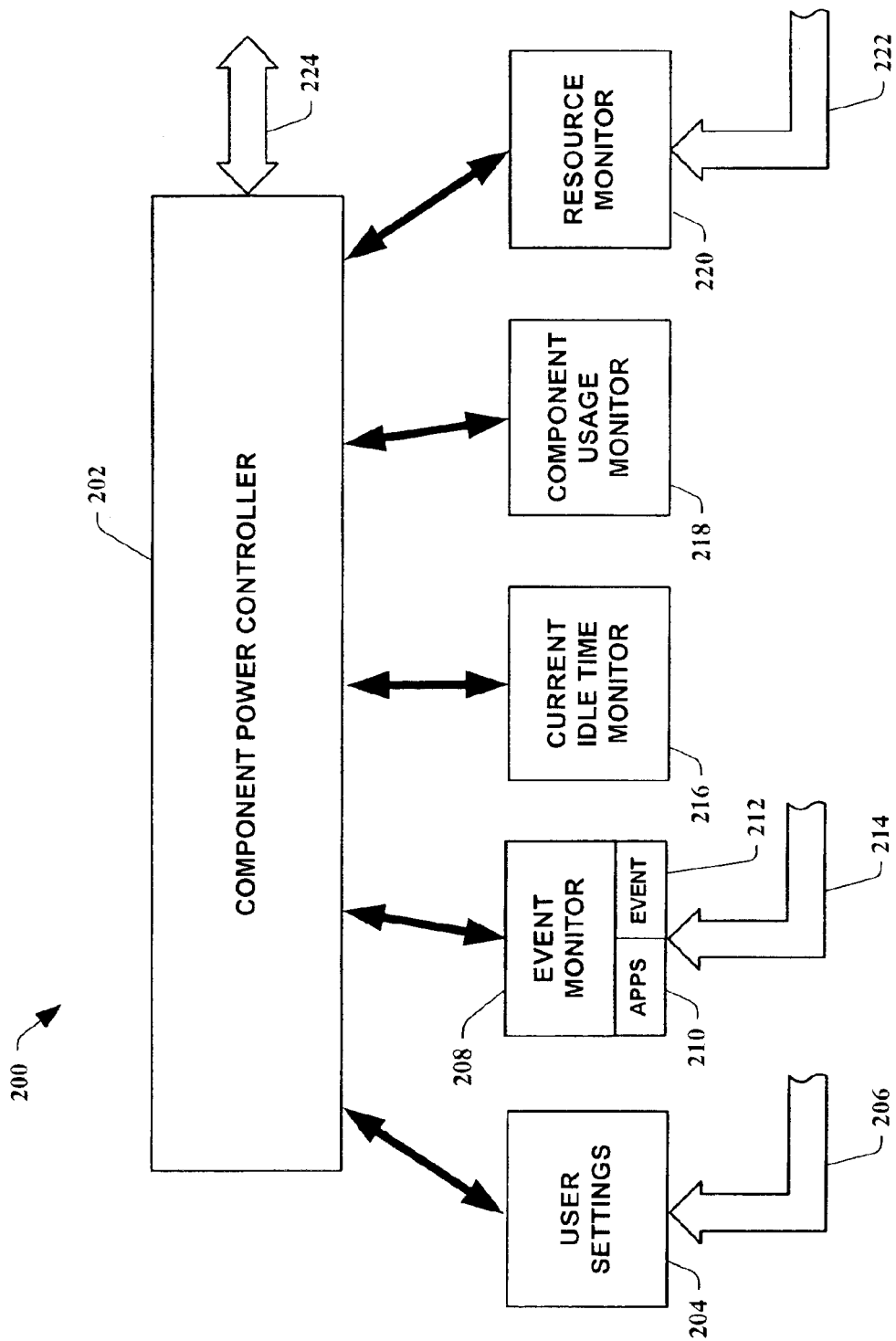
FIG. 2 is an exploded block diagram of a power control device in accordance with an aspect of the present invention.

Turning to FIG. 2, an exploded block diagram of a power control device 200 in accordance with an aspect of the present invention is illustrated. A component power controller 202 comprises the main part of the power control device 200. It interfaces with various subcomponents which vary depending on the instance of the present invention. The power control device 200 illustrated is comprised of the component power controller 202, user settings 204, an event monitor 208 with an application monitor entity 210 and an event request monitor entity 212, a current idle time monitor 216, a component usage monitor 218 and a resource monitor 220. All subcomponents mentioned are not required for every instance of the present invention. An instance of the present invention can include only the component power controller 202, a current idle time monitor 216, and a component usage monitor 218. To one skilled in the art, it can be appreciated that other combinations are possible within the scope of the present invention.

The component power controller 202 determines when to control power to a component and controls the component power via an interface 224 to a component controller (shown in FIG. 1). The determination is based upon inputs from the subcomponents. These inputs include, but are not limited to, such inputs as user configured values (or system default values), what applications are currently running and what events they are initiating, how long the component being controlled has been idle, how long the component has been previously idle before an event requiring power application took place, duration of previous power on states and power off states, and what resources, such as battery power level or CPU usage, is available at a given time. How these subcomponents function is discussed in more detail infra.

The user settings 204 is data (or system defaults) that indicates how a user (or system) desires the component being controlled to behave. This data can be a local file stored and accessible by the component power controller 202 or it can be data stored in a general file already in existence in an operating system. The data values are input into a system, such as a computer or other device, by a user as indicated by input 206. The "user" can be an individual utilizing a computer or a handheld device and the like. The "user" can also be another computer system or other entity with an interface to the power control device 200 and/or a system that the power control device 200 resides within. The data typically is a time value based in time units such as seconds, minutes and hours and the like. Generally, these values indicate how long a device or component should be allowed to remain idle before powering it down as predetermined by the user. Utilizing solely user setting information to control power typically does not increase operational time on a given amount of energy due to occasionally unexpected access to the device, prolonging the power down period (the start of the idle timeout period keeps being reset by each unexpected access).

The event monitor 208 keeps track of what events occur that require utilization of the component being controlled. These events, along with their associated applications/system are provided via an input 214. This data can be a local file stored and accessible by the component power controller 202 or it can be data stored in a general file already in existence in a system. The data is typically provided by the system, such as a computer operating system or other device. The applications and events triggering usage of the controlled component are generally initiated by a user, such as an individual utilizing a computer or a handheld device and the like, or the system itself. The "user" can also be another computer system or other entity with an interface to the power control device 200. The data typically is a list of applications running at a given time and a list of events requiring utilization of the component being controlled. It can also include the frequency of a particular event and also a predictive frequency of a particular event. This data can be stored or utilized real-time by the component power controller 202 to dynamically control the power to the component. Generally, these values facilitate in determining a dynamic idle timeout value utilized to control the power to the component.

The application monitor entity 210 can be part of the event monitor 208 and/or can be an existing entity of a system utilizing the power control device 200. This entity 210 provides the event monitor 208 with information regarding status of applications that are running within the system. The importance of each application can be predetermined or provided by an application itself. For example, if the application running is in a hospital environment and controls an artificial heart transplant's rhythmic beat events (or commands), this application can be given a high priority level such that events associated with this application extend the idle timeout for powering down the component under control.

The event request monitor entity 212 can be part of the event monitor 208 and/or can be an existing entity of a system utilizing the power control device 200. This entity 212 provides the event monitor 208 with information regarding events that require power to the component under control in order for the component to complete the event. For example, a read request is an event that requires a computer's hard drive to be powered up and spinning in order for the requested data to be read from the hard drive.

The current idle time monitor 216 tracks how long the component being controlled has been idle or "unused". This information is generally provided via the input 224 from a component controller (reference 120, see FIG. 1) or device driver that interfaces with the component under control. However, the component under control can interface directly with the power control device 200, providing this information. An existing system component can also provide this information. Typically, this information is compared to values stored in user settings 204. In an instance of the present invention, the value is stored and utilized to dynamically control the component under control. The current idle time monitor 216 can also track historical idle time trends for the component power controller 202. The component power controller 202 can access this information to determine how to control the power to the component.

In one instance of the present invention, the component usage monitor 218 stores prior component usage power states and durations in order to provide the component power controller 202 with historical data regarding the usage of the component under control. The idle timeout value can be altered dynamically based upon information provided by the component usage monitor 218. Previous short power down and power up states of the component under control can result in increased and/or decreased idle timeout values. This provides a dynamic means to control power consumption of the component based on its prior usage.

In another instance of the present invention, the component usage monitor 216 incorporates inputs relating to a status of a user for establishing predictive component usage. Often, the status of the user can be determined through peripheral states. For example, it can be determined that a human user is not present when no inputs have been received from a keyboard and/or mouse for a certain duration. This information can also be combined with statuses related to power states of components such as whether the hard drive and/or monitor are being utilized. This information, when combined, formulates a better determination of whether the user is present. In yet another instance of the present invention, prior knowledge and predictive knowledge can be combined to allow for aggressive power management of the component under control.

The resource monitor 220 tracks the usage and levels of a system's resources via an input 222. The actual resources can be local to the system employing the present invention or they can be remote. For example, a computer system can have an external hard drive powered by an external battery pack. The power remaining in the external battery pack can be monitored by the resource monitor 220 of the present invention. Idle timeout values can be altered dynamically in view of the current energy levels of the external batteries (possibly decreasing the idle timeout value aggressively when the external battery levels are low).

It should be noted that although the subcomponents and component power controller are figuratively illustrated with various inputs and output interfaces, 206, 214, 222, and 224, the data can come from a single input rather than multiple inputs. Some systems may only have a single interface requiring all data to be transferred along that single interface. Other systems may have varying internal architectural structures that permit 1 or 2 or 3 or many input interfaces.

Figure 3:
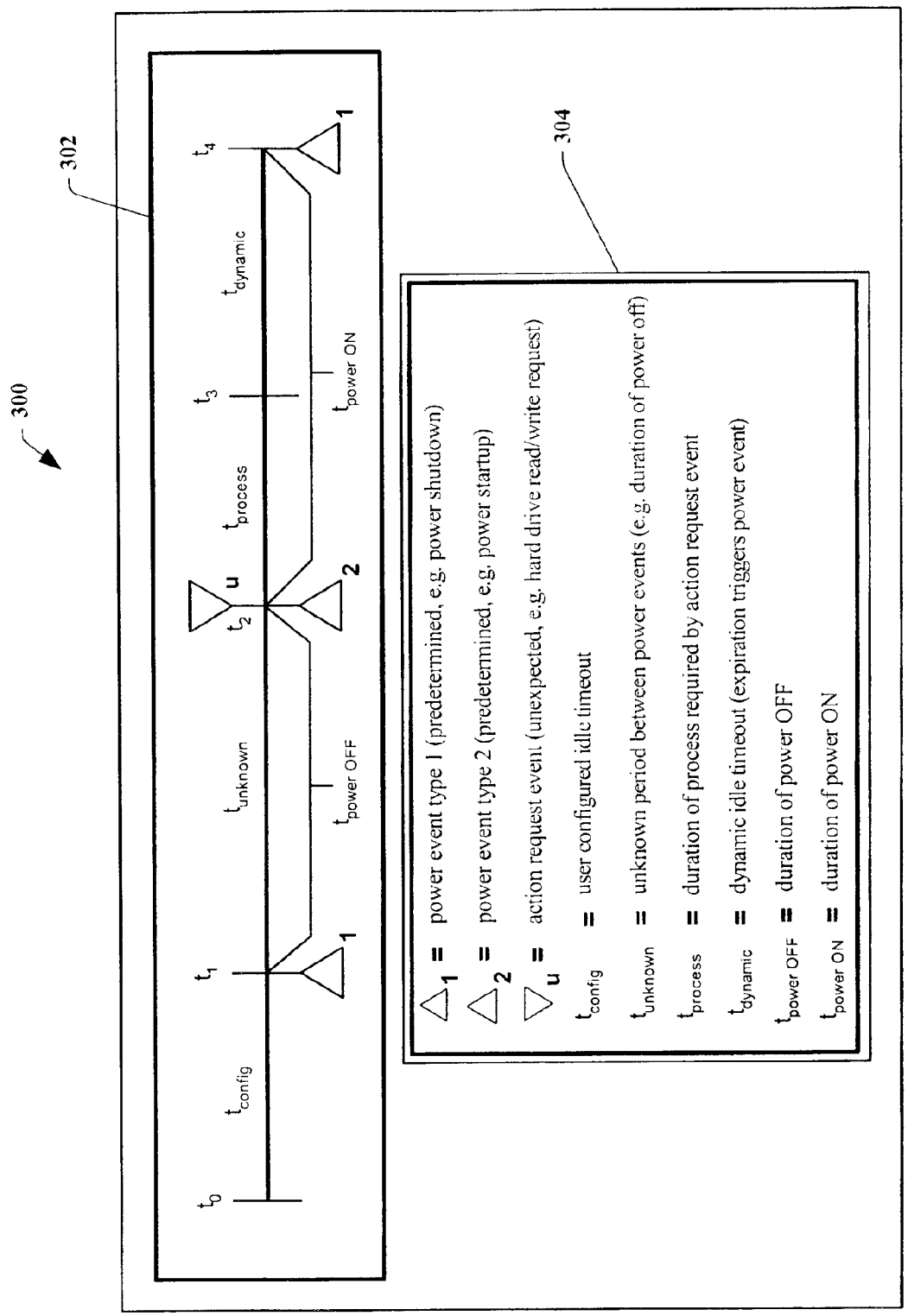
FIG. 3 is a chart illustrating timing sequences in accordance with an aspect of the present invention.

Moving on to FIG. 3, a chart 300 illustrating timing sequences in accordance with an aspect of the present invention is shown. A top chart 302 depicts a typical timing sequence of events that relate to dynamically controlling idle timeout values for the present invention. The bottom chart 304 provides a legend for the top chart 302. An arbitrary start time of the sequence is denoted as $t_0$ and represents the beginning of an idle state of a component under power control. At time $t_1$, a power event type 1 occurs. This can be a predetermined action event such as removing power from a controlled device. The time duration between $t_1$ and $t_o$ is denoted as $t_{config}$. This time period, $t_{config}$, represents a configurable idle timeout period as predetermined by a user and/or by a default parameter of a system (a first time or "initial value"). This is a static value that initiates when the component under control goes idle. At some point in time $t_2$, an unexpected action request event occurs that requires the component under power control to be powered up (power event type 2, predetermined response). The time period between $t_2$ and $t_1$ is unknown and denoted by $t_{unknown}$ (unknown period between power events, e.g. duration of power off). This period, $t_{unknown}$, is equal to the duration that the component was powered off, $t_{power\ OFF}$. The action request event prompts a process to take place (e.g. read or write from a hard drive, etc.) that is completed at a time denoted by $t_3$. The time period between $t_3$ and $t_2$ is the duration of the process denoted by $t_{process}$. At this point in time, $t_3$, the component under control becomes idle and an idle timeout value begins increasing as it did at time, $t_0$. At this juncture (for this instance of the present invention), the present invention utilizes its dynamic processing of parameters discussed supra to determine a dynamic idle timeout value, $t_{dynamic}$, which, when it times out, triggers a power event. This time period, $t_{dynamic}$, when added to time, $t_3$, determines the point in time, $t_4$, when power is removed (power event type 1 occurs) from the component under control. The process time, $t_{process}$, plus the dynamic idle timeout value, $t_{dynamic}$, equals the duration that the component was powered on $t_{power\ ON}$. This illustrates how $t_{dynamic}$ is substituted for $t_{config}$ in a typical system. Time, $t_3$, in essence, is equivalent to time, $t_0$. The present invention replaces the configured timeout value with a dynamic timeout value based upon the parameters discussed supra.

The component power controller evaluates current idle time against the dynamic idle timeout value which can be based on historical component usage and/or event trigger weighting and/or currently available resources (such as battery power, CPU usage, etc.). The component power controller can utilize several varying parameters to determine the dynamic idle timeout value, $t_{dynamic}$. Instances of the present invention include, but are not limited to:

after process ends, wait $t_{unknown}$ plus extra time, $t_{pad}$, before powering down:

$$t_{dynamic} = t_{unknown} + t_{pad} \qquad (Eq.\ 1)$$

reduce the configurable idle timeout value by the duration of the last process if less than the configurable idle timeout:

$$t_{dynamic} = t_{config} - t_{process} (\text{if } t_{process} < t_{config}, \text{else use } t_{config}) \qquad (Eq.\ 2)$$

weight of the process, $t_{process\ weight}$, as determined by the significance of the application and the significance of the action requested along with the prior knowledge of the frequency of repeating the action:

$$t_{dynamic} = t_{process\ weight} \qquad (Eq.\ 3)$$

if the frequency of the process requests, $f_{process}$, is known, $t_{process\ anticipated}$ can be based on this frequency plus extra time, $t_{pad}$, before powering down:

$$t_{dynamic} = t_{process\ anticipated} + t_{pad} \text{(where } t_{process\ anticipated} = [1/f_{process}]) \quad \text{(Eq. 4)}$$

if the time duration for the process, $t_{process}$, is of a short duration (less than a threshold value), the previous dynamic idle timeout value, $t_{dynamic\ previous}$, can be decreased a relatively small amount (typically a reduction in an approximate range of 5% to 20%), $t_{incremental}$, to find the dynamic idle timeout value:

$$t_{dynamic} = t_{dynamic\ previous} - t_{incremental} \text{(when } t_{process} < \text{threshold value)} \quad \text{(Eq. 5)}$$

if it is the first time a component has been powered down, a substantial decrease in time (typically a reduction in an approximate range of 50% to 95%), $t_{substantial\ decrease}$, can be subtracted from the user configured value (or system default), $t_{config}$, to find the dynamic idle timeout value:

$$t_{dynamic} = t_{config} - t_{substantial\ decrease} \text{(when first power down encountered)} \quad \text{(Eq. 6)}$$

and, if the time duration for the powered down state of the component, $t_{power\ OFF}$, is of a short duration (less than a threshold value), the previous dynamic idle timeout value, $t_{dynamic\ previous}$, can be increased a relatively small amount (typically an increase in an approximate range of 5% to 20%), $t_{increment}$, to find the dynamic idle timeout value:

$$t_{dynamic} = t_{dynamic\ previous} + t_{increment} \text{(when } t_{power\ OFF} < \text{threshold value)} \quad \text{(Eq. 7)}$$

Thus, $t_{dynamic}$ can be based solely on historical usage and/or encompass various parameters available to a computing system.

Turning to FIG. 4, an exemplary event data structure 400 in accordance with an aspect of the present invention is illustrated. Data compiled by an event monitor can include such parameters as weight value 402, frequency value 404, application 406 and event 408. The weight 402 given to a particular event 408 can be based upon an application's predetermined importance and/or the event's predetermined importance and/or based on the event's frequency. Typically, a threshold value is chosen for taking action based on the weight of an event. However, it can be implemented without utilizing a threshold value (e.g. multiplying a base idle timeout value by the weight value). In one instance of the present invention, a scale of 1 to 10 can be chosen for the weight values with a threshold value of 5. The dynamic idle timeout is adjusted only when the weight value exceeds the threshold value. The adjustment in the idle timeout value can be an increase or a decrease depending on the desired outcome (e.g. longer idle timeouts desired to maintain power and/or shorter idle timeouts desired to reduce power consumption).

The data structure 400 is merely exemplary and it is to be appreciated that numerous other structures are contemplated that provide for organizing and/or storing a plurality of data types conducive to facilitating component power control in connection with the present invention. Any such data structure suitable for employment in connection with the present invention is intended to fall within the scope of the appended claims. Such data structures can be stored in computer readable media including, but not limited to, memories, disks and carrier waves and the like.

Figure 5:
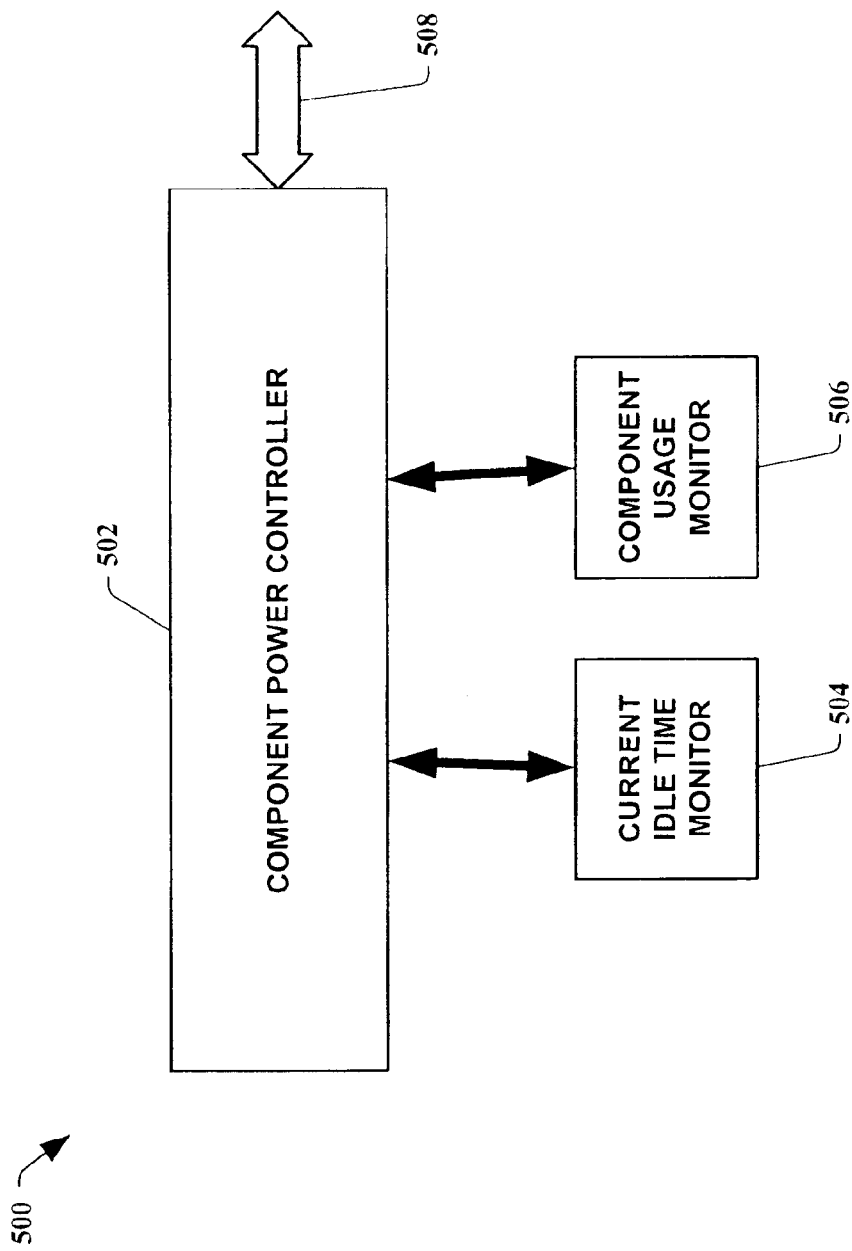
FIG. 5 is a block diagram of a power control device in accordance with an aspect of the present invention.

Looking at FIG. 5, a block diagram of a power control device 500 in accordance with an aspect of the present invention is illustrated. This is a typical instance of the present invention. The power control device 500 is comprised of a component power controller 502, a current idle time monitor 504, and a component usage monitor 506. The component power controller 502 has an interface 508 with a desired component under control (shown in FIG. 1). This interface 508 can be directly to the component under control and/or to a component controller (e.g. a device driver). The component power controller 502 also interfaces with the current idle time monitor 504 and the component usage monitor 506. The current idle time monitor 504 tracks how long the component under control has been idle. It can also track historical idle time trends. The component usage monitor 506 tracks the historical power state (usage) data of the component under control. The component power controller 502 computes a dynamic idle timeout value based on the component usage monitor data. This dynamic idle timeout value is then compared to the current idle time value tracked by the current idle time monitor 504. When the current idle time value approximately equals the dynamic idle timeout value, the component power controller 502 sends a remove power command via interface 508. When the component under control is powered up, a signal can be received by the component power controller 502 via interface 508. This, however, is optional and not required for the power control device to operate. When the component under control becomes idle, the component power controller 502 notifies the current idle time monitor 504 which initiates a clock to track the idle time.

In another instance of the present invention, the component power controller 502 controls both power application and removal to a component under control. Thus, action event requests that require the component under control to be powered up are routed to the component power controller 502. This allows the component power controller to initiate power to the component under control in order to fulfill the action event requests. For example, action event requests can include, but are not limited to, such events as read and/or write commands to a hard drive. This also allows the component power controller 502 the option of grouping various action event requests together to reduce the number of times a component under control is powered up. In other words, requests are "stacked" based on priority level (weight) and not given immediate access to the component under control.

Figure 6:
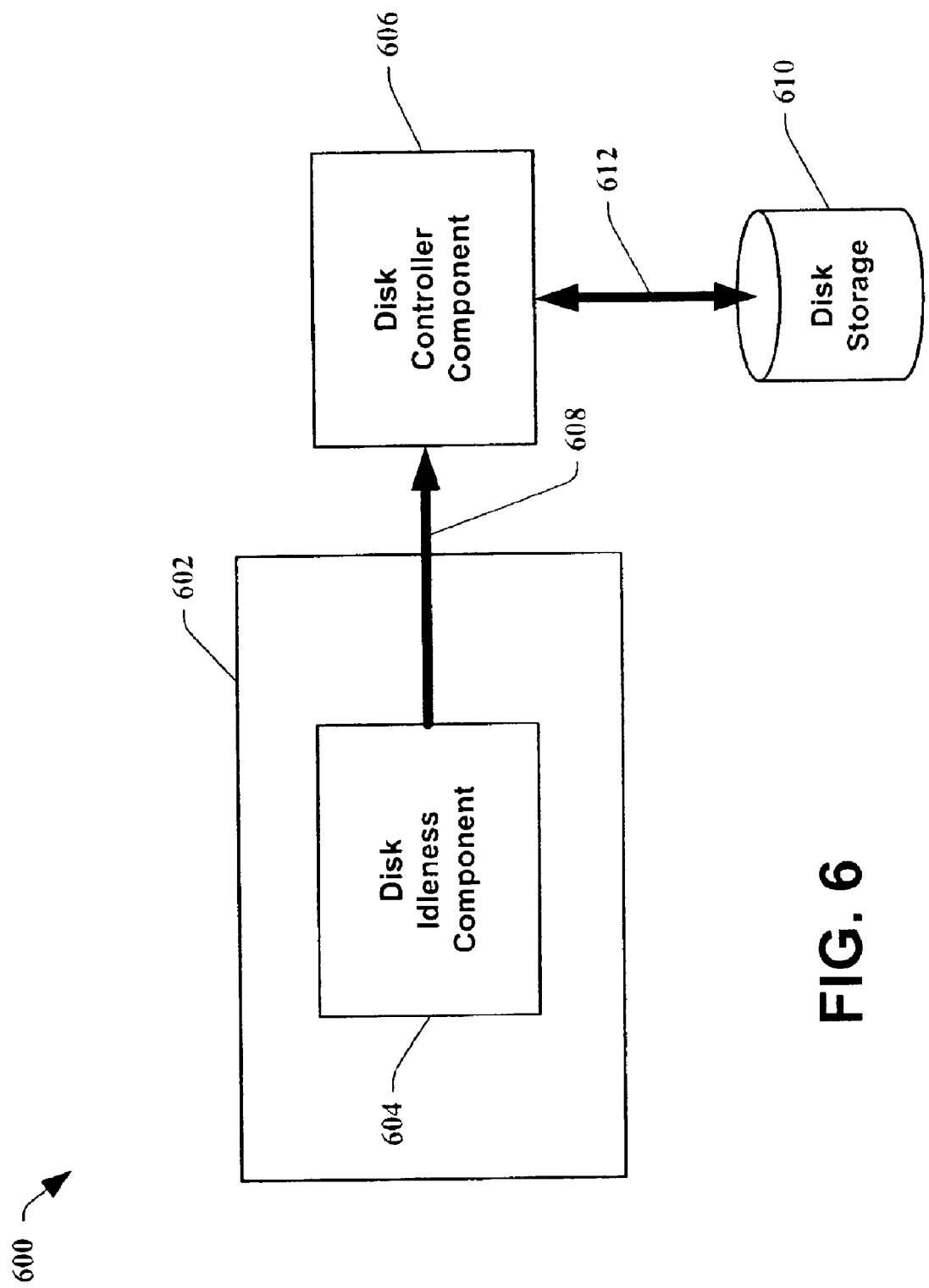
FIG. 6 is another block diagram of a power control system in accordance with an aspect of the present invention.

Referring to FIG. 6, another block diagram of a power control system 600 in accordance with an aspect of the present invention is illustrated. This power control system 600 is comprised of a disk idleness component 604, a disk controller component 606 (i.e. "device driver"), and a disk storage unit 610. The disk idleness component 604 resides in a computer operating system's kernel 602. The disk idleness component 604 communicates with the disk controller component via an interface 608. The disk controller component 606 communicates with the disk storage unit 610 via an interface 612. The disk idleness component 604 in the kernel 602 provides the functionality of a power control device described supra. Thus, the disk idleness component 604 tracks the usage of the hard drive and commands power down when appropriate, based on component usage history.

Operating systems generally provide two operating modes for running software; kernel mode and user mode. The kernel mode is the highly or most trusted mode where software has almost unlimited access to system resources such as I/O and memory addresses and far less exception handling. The user mode is a less trusted mode where software has a controlled access to resources and there is substantially complete exception handling. Device drivers and operating system kernels typically run in kernel mode to improve performance. Applications and other software are usually run in user mode so as to improve overall stability.

Application use information can be provided by a system for a desired device driver of a component under control. This use information can indicate a level of access of the desired device driver and the corresponding component by the user mode application. For example, the use information can indicate that access to the device driver is frequent to the user mode application and that the user mode application will request frequent use of the desired device driver and component. Conversely, as another example, the user information can indicate that accessing the device driver is infrequent to the user mode application (e.g., a CD record driver for an audio player application).

Thus, the power control system 600 has inherent performance gains if it is employed in an operating system's kernel. The application use information for a given disk controller component (device driver) allows the functionality of a disk idleness component to be expanded to include additional functionality as described supra (e.g. application event monitoring, frequency of action requests, weighting of actions, etc.).

Figure 7:
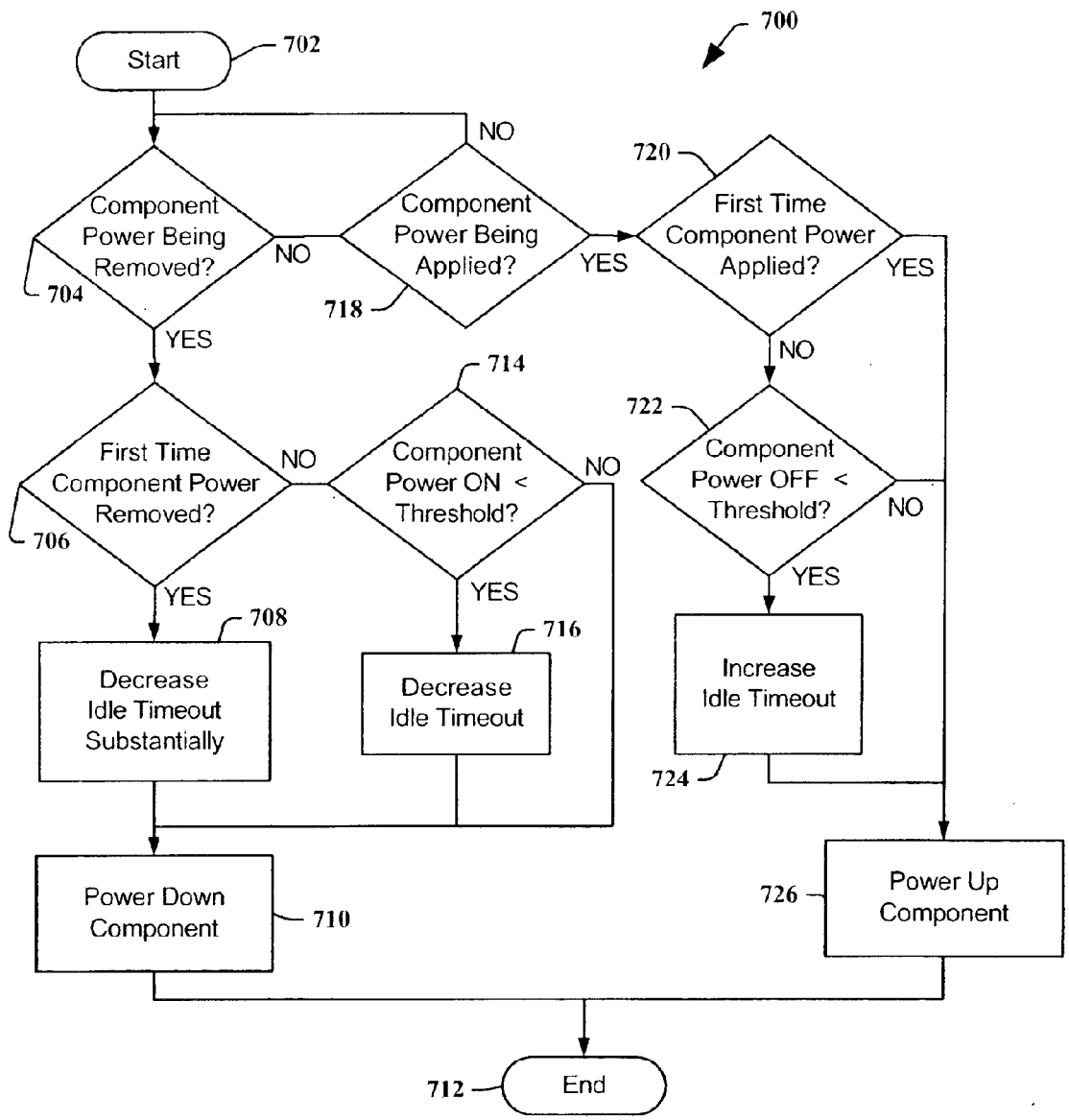
FIG. 7 is a flow diagram illustrating a method of controlling power in accordance with an aspect of the present invention.
Figure 8:
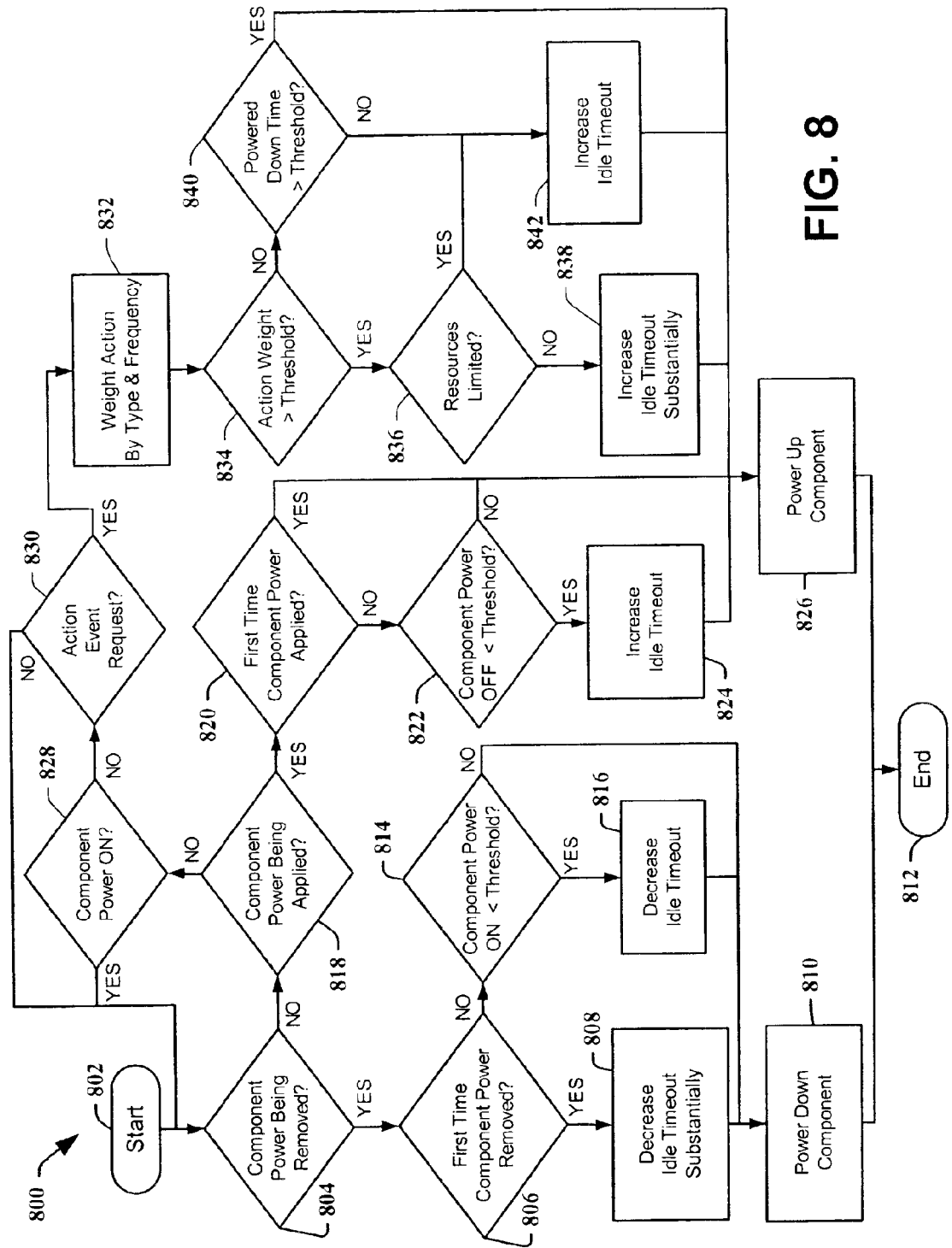
FIG. 8 is another flow diagram illustrating a method of controlling power in accordance with an aspect of the present invention.

In view of the exemplary systems shown and described above, methodologies that may be implemented in accordance with the present invention will be better appreciated with reference to the flow charts of FIGS. 7 and 8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 7, a flow diagram illustrating a method 700 of controlling power in accordance with an aspect of the present invention is shown. The flow start 702 begins with determining whether or not power to the component under control is being removed 704. If the power is being removed, a determination is made as to if this is the first time power to the component has been removed 706. If this is the first time power has been removed, the dynamic idle timeout value is decreased substantially 708. Generally, the first idle timeout value will be equal to a user configured idle timeout value and/or a system default idle timeout value for the component under control. An example of "substantially" decreasing would be reducing the configured idle timeout by an approximate range of 50% to 95%. At this point, the component under control is powered down 710 and the flow end 712 is reached. However, if this is not the first time the component power has been removed 706, a determination is made as to whether the component has previously been powered "ON" longer than a threshold value 714. The threshold value is generally the point at which a benefit is derived from having the component power removed. If the power ON duration is less than the threshold, the dynamic idle timeout value is incrementally decreased 716 and the component under control is powered down 710 and the flow end 712 is reached. The incremental decrease is generally a small magnitude decrease in proportion to the idle timeout value such as an approximate range of 5% to 20% decrease. However, if the component was powered ON longer than the threshold value, the component is powered down 710 and the flow end 712 is reached.

If component power is not being removed 704, a determination is made as to whether component power is being applied 718. If not, the flow is cycled back to determine if power is being removed 704. However, if component power is being applied 718, a determination is made as to if this is the first time power to the component has been applied 720. If this is the first time power has been applied 720, the component is powered up 726 and the flow end 712 is reached. However, if this is not the first time power has been applied 720, a determination is made as to whether the component has previously been powered "OFF" longer than a threshold value 722. If the power OFF duration is less than the threshold, the dynamic idle timeout value is incrementally increased 724 and the component under control is powered up 726 and the flow end 712 is reached. The incremental increase is generally a small magnitude increase in proportion to the idle timeout value such as an approximate range of 5% to 20% increase. However, if the component was powered OFF longer than the threshold value, the component is powered up 726 and the flow end 712 is reached.

FIG. 8 is another flow diagram illustrating a method 800 of controlling power in accordance with an aspect of the present invention. The flow start 802 begins with determining whether or not power to the component under control is being removed 804. If the power is being removed, a determination is made as to if this is the first time power to the component has been removed 806. If this is the first time power has been removed, the dynamic idle timeout value is decreased substantially 808. Generally, the first idle timeout value will be equal to a user configured idle timeout value and/or a system default idle timeout value for the component under control. An example of "substantially" decreasing would be reducing the configured idle timeout by an approximate range of 50% to 95%. At this point, the component under control is powered down 810 and the flow end 812 is reached. However, if this is not the first time component power has been removed 806, a determination is made as to whether the component has previously been powered "ON" longer than a threshold value 814. If the power ON duration is less than the threshold, the dynamic idle timeout value is incrementally decreased 816 and the component under control is powered down 810 and the flow end 812 is reached. The incremental decrease is generally a small magnitude decrease in proportion to the idle timeout value such as an approximate range of 5% to 20% decrease. However, if the component was powered ON longer than the threshold value, the component is powered down 810 and the flow end 812 is reached.

If component power is not being removed 804, a determination is made as to whether component power is being applied 818. If component power is being applied 818, a determination is made as to if this is the first time power to the component has been applied 820. If this is the first time power has been applied 820, the component is powered up 826 and the flow end 812 is reached. However, if this is not the first time power has been applied 820, a determination is made as to whether the component has previously been powered "OFF" longer than a threshold value 822. If the power OFF duration is less than the threshold, the dynamic idle timeout value is incrementally increased 824 and the component under control is powered up 826 and the flow end 812 is reached. The incremental increase is generally a small magnitude increase in proportion to the idle timeout value such as an approximate range of 5% to 20% increase. However, if the component was powered OFF longer than the threshold value, the component is powered up 826 and the flow end 812 is reached.

However, if component power is not being applied, a determination is made as to if component power is ON 828. If component power is ON 828, the flow cycles back to determine if component power is being removed 804. If component power is not ON 828, a determination is made as to if an action event request has been made 830. This type of request includes, but is not limited to, such things as read and/or write requests for a component under control such as a hard drive. If no action event request has been made 830, the flow cycles back to check if the component power is being removed 804. If, however, an action event request has been made 830, the action event is given a weight value based upon type and/or frequency of occurrence 832. Type can include such things as priority, expected impact on the system resources, and user expectations, etc. A determination is then made as to whether the weight value exceeds a given threshold value 834. This threshold value is generally predetermined by a system and/or user and exceeding the threshold is interpreted to mean the action event is of a high priority. The scale of importance can also be reversed such that a lesser value indicates higher importance (and, thus, requiring being less than instead of greater than a threshold). If the threshold is exceeded 834, a determination is made as to the state of the resources available to the system and/or component under control 836. These resources include such things as remaining battery power, CPU usage and the like. If these resources are not limited (as determined by the system and/or component), the idle timeout value is increased substantially 838 and the component under control is powered up 826, ending 812 the flow. An example of "substantially" increasing would be increasing the configured idle timeout by an approximate range of 50% to 200%. If, however, the resources are limited 836, the idle timeout value is increased only an incremental amount 842. The incremental increase is generally a small magnitude increase in proportion to the idle timeout value such as an approximate range of 5% to 20% increase.

If during the determination of the weight of the action event 834, the weight value does not exceed the threshold value, a determination is made as to the length of time the component under control has been powered down 840. This determination is based upon subjective system assessment and could range from a few milliseconds to several seconds to several minutes or even to hours and days. The duration can also be based upon a multiple of the last idle timeout value. Generally, the duration threshold value is predetermined for a given component under control. If the component under control surpasses the threshold, the component under control is powered up 826, ending 812 the flow. However, if the powered down time does not exceed the threshold, the idle timeout value is increased incrementally 842 and the component under control is powered up 826, ending 812 the flow. The incremental increase is generally a small magnitude increase in proportion to the idle timeout value such as a 5% to 20% increase.

Figure 9:
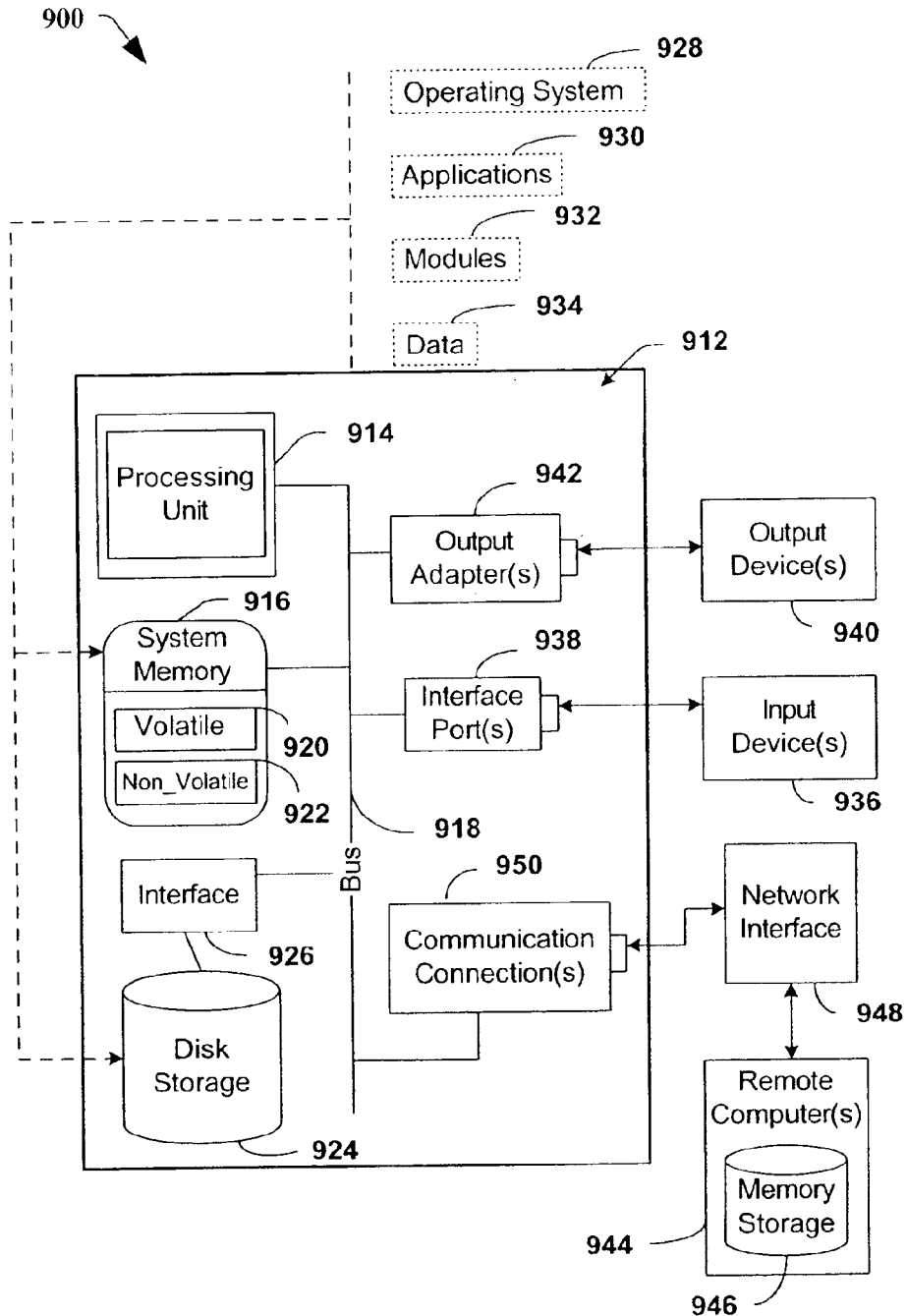
FIG. 9 illustrates an example operating environment in which the present invention can function.

In order to provide additional context for various aspects of the present invention, FIG. 9 and the following discussion are intended to provide a brief, general description of a suitable operating environment 900 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 900 is only one example of a suitable operating environment and is not intended to suggest any limitation as to the scope of use or functionality of the invention. Other well known computer systems, environments, and/or configurations that may be suitable for use with the invention include but are not limited to, personal computers, handheld or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 900 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 15-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example, a disk storage 924. Disk storage 924 includes, but is not limited to, devices like a magnetic disk drive, floppy disk drive, tape drive, Jazz drive, Zip drive, LS-100 drive, flash memory card, and/or memory stick and the like. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in a suitable operating environment 900. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the possessing unit 916 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1502.3, Token Ring/IEEE 1502.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
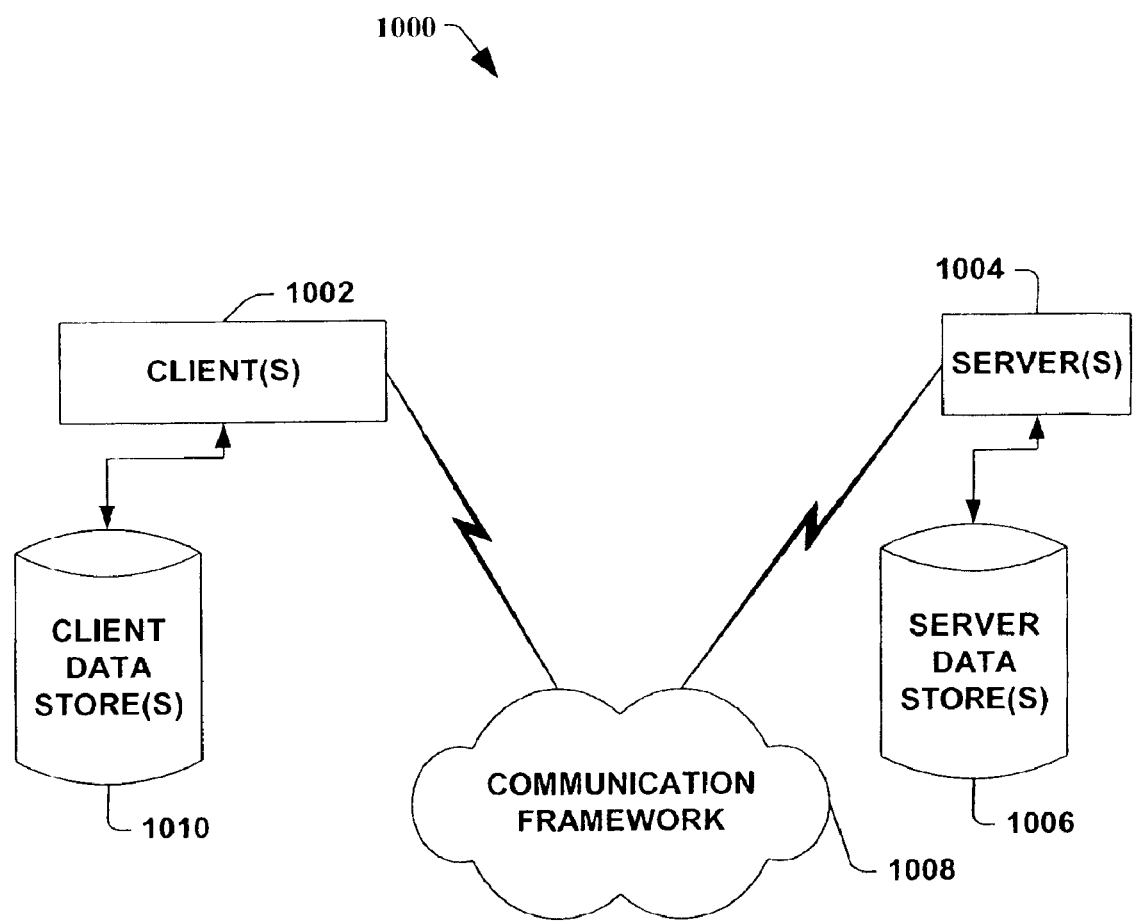
FIG. 10 illustrates another example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are operably connected to one or more client data store(s) 1010 that can be employed to store information local to the client(s) 1002. Similarly, the server (s) 1004 are operably connected to one or more server data store(s) 1006 that can be employed to store information local to the servers 1004.

It is to be appreciated that the apparatus, systems and/or methods of the present invention can be utilized in an overall power conservation scheme facilitating computer components and non-computer related components alike. Further, those skilled in the art will recognize that the apparatus, systems and/or methods of the present invention can be employed in a vast array of electronic related technologies, including, but not limited to, computers, photocopiers, document scanners, personal digital assistants, fax machines, digital cameras, digital video cameras and/or video games and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system facilitating dynamic component power control, comprising:
   a power control device that provides information associated with component power control, based, at least in part, upon historical component usage information; and
   a component controller that controls power to a component, based, at least in part, upon the information from the power control device, wherein the component controller formulates a dynamic idle timeout value which includes accounting for user settings related to the component and wherein the user settings are reduced substantially in an approximate range of 50% to 95% when component power is removed a first time.

2. The system of claim 1, the component comprising a hard disk.

3. The system of claim 1, the component controller comprising a disk controller component.

4. The system of claim 1, the power control device comprising a disk idleness component in an operating system's kernel.

5. The system of claim 1, the component controller comprising a device driver for the component, interfacing to both the component and power control device.

6. The system of claim 1, the power control device comprising:
   a component power controller for sending, receiving and analyzing information pertinent to power control of a component; and
   at least one subcomponent interfacing with the component power controller, providing data related to the power control of the component.

7. The system of claim 6, the subcomponents provided by an operating system hosting the power control device.

8. The system of claim 6, the subcomponents comprising:
   a current idle time monitor subcomponent; and
   a component usage monitor subcomponent.

9. The system of claim 8, the component usage monitor subcomponent comprising, at least in part, inputs relating to a user's status for determining if the user is present.

10. The system of claim 6, the subcomponents further comprising a user settings subcomponent.

11. The system of claim 6, the subcomponents further comprising a resource monitor subcomponent.

12. The system of claim 6, the subcomponents further comprising an event monitor subcomponent.

13. The system of claim 12, the event monitor subcomponent comprising:
    an application monitor entity; and
    an event request monitor entity.

14. A system facilitating dynamic component power control, comprising a power control device that provides information associated with component power control, based, at least in part, upon historical component usage information, wherein the power control device formulates a dynamic idle timeout value which includes accounting for user settings related to the component and wherein the user settings are reduced substantially in an approximate range of 50% to 95% when component power is removed a first time.

15. The system of claim 14, the power control device comprising:
    a component power controller for sending, receiving and analyzing information pertinent to power control of a component; and
    at least one subcomponent interfacing with the component power controller, providing data related to the power control of the component.

16. The system of claim 15, the power control device having a capability to send power control information to at least one remote component controller.

17. The system of claim 15, the power control device having a capability to send power control information to at least one remote component.

18. The system of claim 15, the power control device residing within an operating system's kernel.

19. A method for facilitating dynamic component power control, comprising:
    determining a component's usage; and
    formulating a dynamic idle timeout value based on the component's usage, wherein formulating a dynamic idle timeout value includes accounting for user settings related to the component and wherein the user settings are reduced substantially in an approximate range of 50% to 95% when component power is removed a first time.

20. The method of claim 19, wherein determining a component's usage is based on a previous duration of a component's power removed time.

21. The method of claim 19, wherein determining a component's usage is based on a previous duration of a process requiring utilization of the component.

22. The method of claim 19, wherein determining a component's usage is based on a previous duration of a component's power applied time.

23. The method of claim 19, wherein formulating a dynamic idle timeout value includes accounting for resources available to a system.

24. The method of claim 19, wherein formulating a dynamic idle timeout value includes accounting for resources available to the component.

25. The method of claim 19, wherein formulating a dynamic idle timeout value includes accounting for events requiring utilization of the component.

26. A method for facilitating dynamic component power control, comprising:
    determining a component's usage; and
    formulating a dynamic idle timeout value based on the component's usage, wherein formulating a dynamic idle timeout value include accounting for user settings related to the component and wherein the user settings are reduced in an approximate range of 5% to 20% when component power is removed alter a first time.

27. The method of claim 19, wherein formulating a dynamic idle timeout value includes accounting for system settings related to the component.

28. The method of claim 19, wherein formulating a dynamic idle timeout value includes accounting for a user's status.

29. The method of claim 19, further comprising:
    comparing the dynamic idle timeout value to the component's current idle time value; and
    providing notice when the dynamic idle timeout value approximates the current idle time value.

30. The method of claim 29, further comprising interfacing with a component controller to relay information related to dynamically controlling power of the component.

31. The method of claim 29, further comprising interfacing with a component to relay information related to dynamically controlling power of the component.

32. A method for facilitating dynamic component power control, comprising:
    monitoring power states of a component;
    monitoring events requiring utilization of the component;
    weighting the events based on a priority level;
    determining component's usage;
    formulating a dynamic idle timeout value based on the component's usage and weight of the events requiring utilization of the component;
    comparing the dynamic idle timeout value to the component's current idle time value;
    providing notice when the dynamic idle timeout value approximates the current idle time value; and
    determining a weighting threshold, wherein the dynamic idle timeout is increased substantially in an approximate range of 50% to 200% when the weighting threshold is surpassed.

33. The method of claim 32, wherein monitoring power states includes at least one from a group consisting of power applied, power removed, power apply request, and power remove request.

34. The method of claim 32, wherein monitoring events includes at least one from a group consisting of application requests for utilization of the component and system requests for utilization of the component.

35. The method of claim 32, wherein weighting the events is based on at least one from a group consisting of frequency of the event, predicted frequency of the event, and priority of the event.

36. The method of claim 32, further including determining if power resources are limited for the component.

37. A method for facilitating dynamic component power control, comprising:

monitoring power states of a component;

monitoring events requiting utilization of the component;

weighting the events based on a priority level;

determining a component's usage;

formulating a dynamic idle timeout value based on the component's usage and weight of the events requiring utilization of the component;

comparing the dynamic idle timeout value to the component's current idle time value;

providing notice when the dynamic idle timeout value approximates the current idle time value;

determining a weighting threshold; and determining if power resources are limited for the component, wherein the dynamic idle timeout is increased substantially in an approximate range of 50% to 200% when resources are not limited and the weighting threshold is surpassed.

38. A computer readable medium storing computer executable components of a system for controlling power of a component, comprising a power control device that provides information associated with component power control, based, at least in part, upon historical component usage information, wherein the power user settings related to the component and wherein the user settings are reduced substantially in an approximate range of 50% to 95% when component power is removed a first time.

39. The computer readable medium of claim 38, the power control device comprises:

a component power controller for sending, receiving and analyzing information pertinent to power control of a component; and at least one subcomponent interfacing with the component power controller, providing data related to the power control of the component.

40. A device employing the system of claim 14 comprising at least one from a group consisting of a computer, a server, a handheld electronic device, a photocopier, a scanner, a fax machine, a digital camera, and a digital video camera.

41. A dynamic component power control system, comprising:

means for receiving usage information of a component;

means for determining a dynamic idle timeout value, based, in part, on historical usage information of the component;

means for comparing the dynamic idle timeout value to a current idle time value;

means for notifying the component when the dynamic idle timeout value approximately equals the current idle time value; and means for determining a weighting threshold, wherein the dynamic idle timeout value is increased substantially in an approximate 50% to 200% when the weighting threshold is surpassed.

* * * * *